United States Patent Office 3,307,568
Patented Mar. 7, 1967

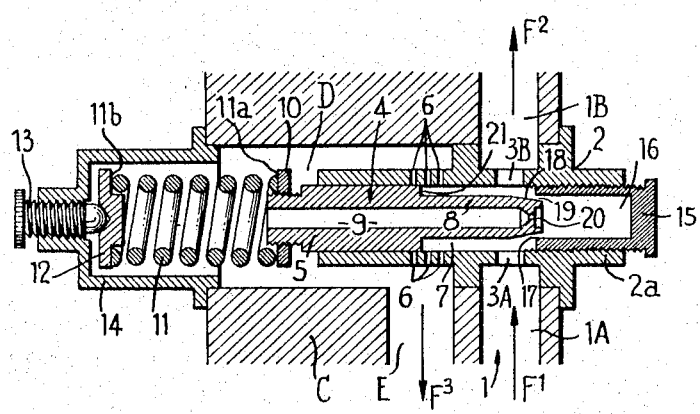

3,307,568
HYDRAULIC PRESSURE REGULATOR
Berthold Gartner, Rueil-Malmaison, France, assignor to Bronzavia, Courbevoie, France, a French body corporate
Filed Mar. 27, 1964, Ser. No. 355,290
Claims priority, application France, Apr. 3, 1963, 930,256
9 Claims. (Cl. 137—115)

The invention relates to a hydraulic pressure regulator ensuring that the delivery pressure of a hydraulic generator is constant irrespective of variations in the flow necessary for the good operation of the receiving system, provided the variations rest within the limits of the operational capacity of the generator.

Such a regulator can be, for example, employed to maintain the supply of oil to a servomechanism constant, the hydraulic generator consisting of a pump of any type of suitable power.

This regulator is of the type comprising a fixed sleeve which is disposed in a conduit putting the generator in communication with the receiving and utilizing means and is provided with transverse ports by way of which the fluid current flows constantly through said sleeve, and a slide valve axially slidable in the sleeve and regulating, as a function of the pressure within the sleeve, the section of the passageways putting the inner chamber of the sleeve in communication with an escape conduit through which the fluid is returned to a reservoir at atmospheric pressure.

In devices of this type it is known to associate with the slide valve a return spring which acts in the longitudinal direction on the slide valve and is compressed to a varying extent in opposition to the action exerted on the slide valve by the fluid to be regulated.

The use of this opposing spring has a drawback since it is well known that the force or reaction of such a spring varies when the length of the spring varies under the effect of the forces opposed thereto and that, therefore, said force of reaction varies in function of the slide-valve position; in most applications, this variation constitutes a regulation defect since it is an imperfection in the constancy of the regulation to be obtained.

This variation can be considerably reduced if a spring of great length is employed so that the displacement of the slide valve in either direction, corresponding to a variation in the length of the spring equal to the amplitude of this displacement, constitutes a very small relative variation in the length of the spring. But this requires the use of a very long spring and consequently the regulator has a large overall size. Such a regulator would be very costly and in many cases unacceptable owing to its size.

The object of the invention is to avoid this drawback and to provide a regulator in which a short spring is employed but in which the variation of the effort thereof is compensated by a special arrangement of the regulator.

Another object of the invention is to provide in this way a regulator in which the said variation is practically eliminated or even a regulator in which the direction of the effect of this variation can be reversed, i.e. the variation of the effect of the spring effort is over-compensated.

Another object of the invention is to provide a regulator having high stability, that is, a regulator whose point of equilibrium can be reached very rapidly.

The regulator according to the invention comprises a modulated pressure chamber put in communication with the inner chamber of the fixed sleeve by a variable-section nozzle whose section is formed by the space between one end of the slide valve and a fixed seating, said modulated pressure acting on said one end of the slide valve in the same direction as the inner pressure of the inner chamber of the sleeve which acts on another section of the slide valve, the actions of said two pressures being added together and balanced by the opposing action exerted by a spring on the other end of the slide valve, and the end of the slide valve forming the variable-section nozzle comprises a calibrated fixed section orifice which constantly puts the modulated pressure chamber in communication with the escape conduit. Said communication is by way of a longitudinal passageway formed within the slide valve, said fixed section nozzle opening out in the end of said passageway opposed to the spring, the other end of the passageway in the vicinity of the spring communicating with an inner chamber which communicates with the escape conduit.

Further features and advantages of the invention will be apparent from the ensuing description with reference to the accompanying drawings to which the invention is in no way limited.

In the drawings:
The figure is a diagrammatic sectional view of a hydraulic regulator according to the invention.

The regulator according to the invention is adapted to regulate the utilization pressure of a fluid circulating in a conduit 1 including an upstream portion or delivery conduit 1A and a portion or utilization conduit 1B, the portion 1A being connected to the pressure generator (not shown) consisting of for example a pump, and the portion 1B being connected to the receiving or utilization system, for example a servomechanism (not shown).

The fluid therefore circulates in the direction indicated by the arrows F1 and F2 and the regulator R is mounted in this circuit between the portions 1A and 1B and has for function to regulate the delivery pressure of the generator irrespective of the magnitude of the flow required by the utilization system. This regulator comprises a fixed sleeve 2 fitted in a casing or body C which can be a separate casing proper to this regulator or, when the latter is incorporated in the generator itself, can constitute a portion of the casing of the latter.

This fixed casing can, for example, comprise the portions of conduits 1A and 1B and a chamber D in which is partly housed the regulator, this chamber being provided with an escape conduit E connected to a fluid reservoir subjected to the pressure of the surrounding free air. The sleeve 2 is provided with ports 3A, 3B through which the fluid constantly circulates from the conduit 1A to the conduit 1B.

Slidable in this sleeve with a very slight clearance (of the order of some microns) is a slide valve 4 comprising a cylindrical portion 5 which cooperates with the inner cylindrical face of the sleeve 2 so as to uncover or mask a series of orifices 6 which put the inner chamber 7 of the sleeve in communication with the chamber D of the casing, and a cylindrical portion 8 of smaller diameter provided with a longitudinal passageway 9.

The left end of the slide valve (as viewed in the figure) is provided with a plate 10 which is preferably adjustable in position and against which bears the end 11a of a compression spring 11 whose other end 11b bears against a plate 12 which is adjustable in position by a screw 13 screwed in a bell-shape housing 14 secured to the casing C and closing this end of the chamber D.

The sleeve 2 is extended by a portion 2a outside the casing C and is closed by a hollow plug 15 defining a chamber 16 termed the "modulated pressure chamber." The inner wall of this chamber includes a circular edge or annular surface 17 forming a seating for the end 18 of the slide valve, this end having the shape of an approximately conical surface which bears, in the position of rest of the device, against the seating 17 and closes off the communication between the chamber 16 and the chamber 7.

If the slide valve is urged toward the left (as viewed in the figure) it defines between the conical end thereof and the seating 17 an annular nozzle or jet 19 of variable section.

The chamber 16 communicates with the axial passageway of the slideway by way of a calibrated orifice 20 forming a nozzle or jet of constant section formed in the end wall of the slide valve.

This device operates in the following manner:

The fluid delivered by the generator to the conduits 1A and 1B flows through the sleeve 2. The instantaneous pressure $p$ of this fluid prevails in the chamber 7 and is constantly applied against the ring or shoulder 21 interconnecting the portions 5 and 8 of the slide valve. If $S_1$ is the area of this shoulder, the fluid exerts thereon a force $f_1 = p.S_1$.

Further, the fluid enters the chamber 16 by way of the variable-section nozzle 19 and, in passing through the fixed-section nozzle 20 and the passageway 9, enters the chamber D and escapes by way of the conduit E to the reservoir which is at atmospheric pressure; thus the chamber D is at substantially atmospheric pressure.

Consequently, there is created in the chamber 16 a variable pressure $p_m$ termed the "modulated pressure." If $S_2$ is the sectional area of the end 8 of the slide valve, the modulated pressure exerts on the slide valve a force $f_2 = p_m.S_2$ in the same direction as the force $f_1$. The added actions of these two forces tends to urge the slide valve toward the left (as viewed in the figure) and are balanced by the force exerted in the opposite direction by the resisting spring 11.

In the position of equilibrium some of the orifices 6 can be open and a part of the fluid is consequently connected to the escape conduit E leading to the reservoir in the direction of the arrow F3.

As mentioned hereinbefore, the function of the device is to insure that the delivery pressure in the conduit 1 remains constant irrespective of the magnitude of the required flow. That is to say in respect of all flows for the perfect operation of the receiver, namely all positions of equilibrium of the slide valve and consequently all positions of the opposing spring, the delivery pressure remains constant.

As the sections S1 and S2 are constant, and in the various states of equilibrium the delivery pressure $p$ (which is to be varied) is constant, any variation in the force exerted by the spring 11 due to the characteristic of this spring must be compensated by a variation in the modulated pressure $p_m$.

To take a first extreme hypothetical case, if the distance between the frustoconical end 18 of the slide valve and its seating 17 is sufficiently great for the area of the section of the nozzle 19 to be much greater than the area of the section of the nozzle 20, the value of the modulated pressure (in the chamber 16) is very close to the value of the delivery pressure $p$ to be regulated (in the chamber 7). In the opposite extreme hypothetical case, when the variable-section nozzle 19 is completely closed by the frustoconical end of the slide valve, the modulated pressure is rapidly equalized through the fixed section nozzle 20 with the inner pressure of the passageway 9 whose absolute value is substantially equal to that of atmospheric pressure. The modulated pressure can therefore assume any intermediate value between these two extreme values, depending on the position of the slide valve.

If in starting from a position of equilibrium an increased flow is required by the receiver this increase immediately results in a drop in the delivery pressure. The equilibrium of the forces is lost and the slide valve is shifted under the effect of the force exerted by the spring toward the right (as viewed in the figure) and progressively masks off the orifices 6 leading to the escape conduit and decreases the section of the nozzle 19.

The drop in the delivery pressure and the reduced section of the nozzle 19 result in a drop in the modulated pressure acting on the section S2 so that the displacement toward the right begun by the slide valve is accelerated. Consequently, there is an additional decrease in the passage section through the orifices 6 and an increase in the flow in the utilization conduit 1B.

The buffer action of the modulated pressure chamber tends to damp the variations in the delivery pressure within the neighbourhood of the positions of equilibrium. This action is particularly noticeable in the case of sudden variations in the value to be regulated.

It will also be observed that the pressure in the modulated pressure chamber drops a little later than the pressure in the chamber D of the spring. There is merely an out-of-phase condition between these two actions and a detailed analysis of this phenomenon shows that this out-of-phase condition permits obtaining a state of equilibrium more quickly and therefore contributes to higher stability of the device.

In the event of an increase in the delivery pressure of the generator subsequent to a decrease in the flow required by the receiver, there occurs, in accordance with a procedure which is the reverse of that of the preceding case, a progressive connection of the delivery conduit of the hydraulic generator to the escape conduit.

This device enables a very short spring to be employed and results in a very small overall regulator size. This spring can have a high degree—for example 50%—of variation of its effort in function of the slide-valve position, but the use of the modulated pressure chamber with its compensating action makes it possible to construct a regulator wherein the effect of this variation is practically entirely compensated.

The compensation can be obtained in all positions of the slide valve in giving the end thereof (previously termed "conical" portion) the shape of a surface of revolution having a generatrix of more or less accentuated curvature. In so designing this curvature and in so choosing the diameter of this end a perfect compensation of the effect of the variation of the spring effort can be obtained; it is even possible to obtain an over-compensation which permits reversing the direction of the effect of said variation, which could be of some utility in certain applications.

Although a specific embodiment of the invention has been described, many modifications and changes may be made therein without departing from the scope of the invention as defined in the appended claims.

Having now described my invention what I claim as new and desire to secure by Letters Patent is:

1. A hydraulic regulator for insertion between a hydraulic generator and a receiving system connected to the delivery side of the generator so as to maintain the delivery pressure of the generator constant, said regulator comprising means defining a body, a fixed sleeve mounted in the body and having an inner chamber, transverse ports formed in the sleeve, a conduit communicating with one of the ports and adapted to be connected to the delivery side of the generator, a second conduit communicating with the other of said ports and adapted to be connected to the receiving system, whereby the fluid in said conduits flows constantly through the sleeve by way of the ports, a slide valve axially slidable in the sleeve, escape orifices provided in the sleeve, an escape conduit at atmospheric pressure in communication with the inner chamber by way of the orifices, a masking portion provided on the slide valve and co-operating with the orifices so as to close to a varying extent the fluid passage section of the orifices in accordance with the fluid pressure prevailing in the inner chamber, a modulated pressure chamber in the body, a variable-section nozzle putting the modulated pressure chamber in communication with the inner chamber, the variable-section nozzle comprising an end portion of the slide valve and a seating fixed in the body, the end portion of the slide valve having a cross-sectional size which varies axially of the slide valve, a spring disposed in the body and bearing against and biasing the slide valve to move axially in the sleeve, the pressure of the fluid in the modulated pressure chamber acting on said end portion of the valve in the same direction as the pressure of the fluid in the inner chamber which acts on another portion of the valve so that the actions of said pressures are added together, said spring biasing the valve in a direction opposed to said actions, the regulator further comprising a calibrated fixed-section orifice formed in said end portion of the slide valve, and means defining a passageway putting the side of the fixed-section orifice remote from the modulated pressure chamber in communication with the escape conduit whereby the modulated pressure chamber is in permanent communication with the escape conduit.

2. A hydraulic regulator as claimed in claim 1, wherein a part of said passageway is formed by a longitudinal passage formed in the slide valve.

3. A hydraulic regulator as claimed in claim, wherein the spring bears against the end of the slide valve remote from said end portion thereof, an escape chamber is formed in the body around the end of the slide valve remote from said end portion and communicates with the escape conduit, said passage opening into the escape chamber at said end of the slide valve adjacent the spring.

4. A hydraulic regulator as claimed in claim 1, comprising a plate mounted on the slide valve and a plate mounted on the body so as to be adjustable relative to the body axially of the slide valve, the spring being interposed between the two plates.

5. A hydraulic regulator as claimed in claim 1, wherein said end portion of the slide valve has a substantially frustoconical shape.

6. A hydraulic regulator as claimed in claim 1, wherein said end portion of the slide valve has a surface of revolution whose generatrix is a curve the curvature of which is such as to provide a perfect compensation of the effect of the variation of the spring effort in function of the slide-valve positions in stabilized working conditions.

7. A hydraulic regulator as claimed in claim 1, comprising a plug mounted in the body so as to be adjustable therein axially of the slide valve, the plug forming one end of the modulated pressure chamber and comprising a portion constituting said seating, whereby it is possible to obtain a given passage section of the variable-section nozzle for a well-defined position of said masking portion of the slide valve relative to the escape orifices irrespective of deviations, due to manufacturing tolerances, from the correct position of the escape orifices in the sleeve and from the correct position of the masking portion on the slide valve.

8. A hydraulic regulator as claimed in claim 1, wherein said spring is short and relatively stiff and, the value of its effort having a large range of variation in function of the slide-valve positions in stabilized working conditions, the effect of this variation is compensated by variation in the fluid pressure in the modulated pressure chamber.

9. A hydraulic regulator as claimed in claim 1, wherein said spring is short and relatively stiff and, the value of its effort having a large range of variation in function of the slide-valve positions in stabilized working conditions, the effect of this variation is over-compensated by variation in the fluid pressure in the modulated pressure chamber.

References Cited by the Examiner
UNITED STATES PATENTS

| 2,210,295 | 8/1940 | Johnson | 137—108 |
| 2,989,975 | 6/1961 | Gartner | 137—117 |
| 3,106,934 | 10/1963 | Rogers et al. | 137—117 |

WILLIAM F. O'DEA, *Primary Examiner.*

D. J. ZOBKIW, *Assistant Examiner.*